Patented Feb. 27, 1940

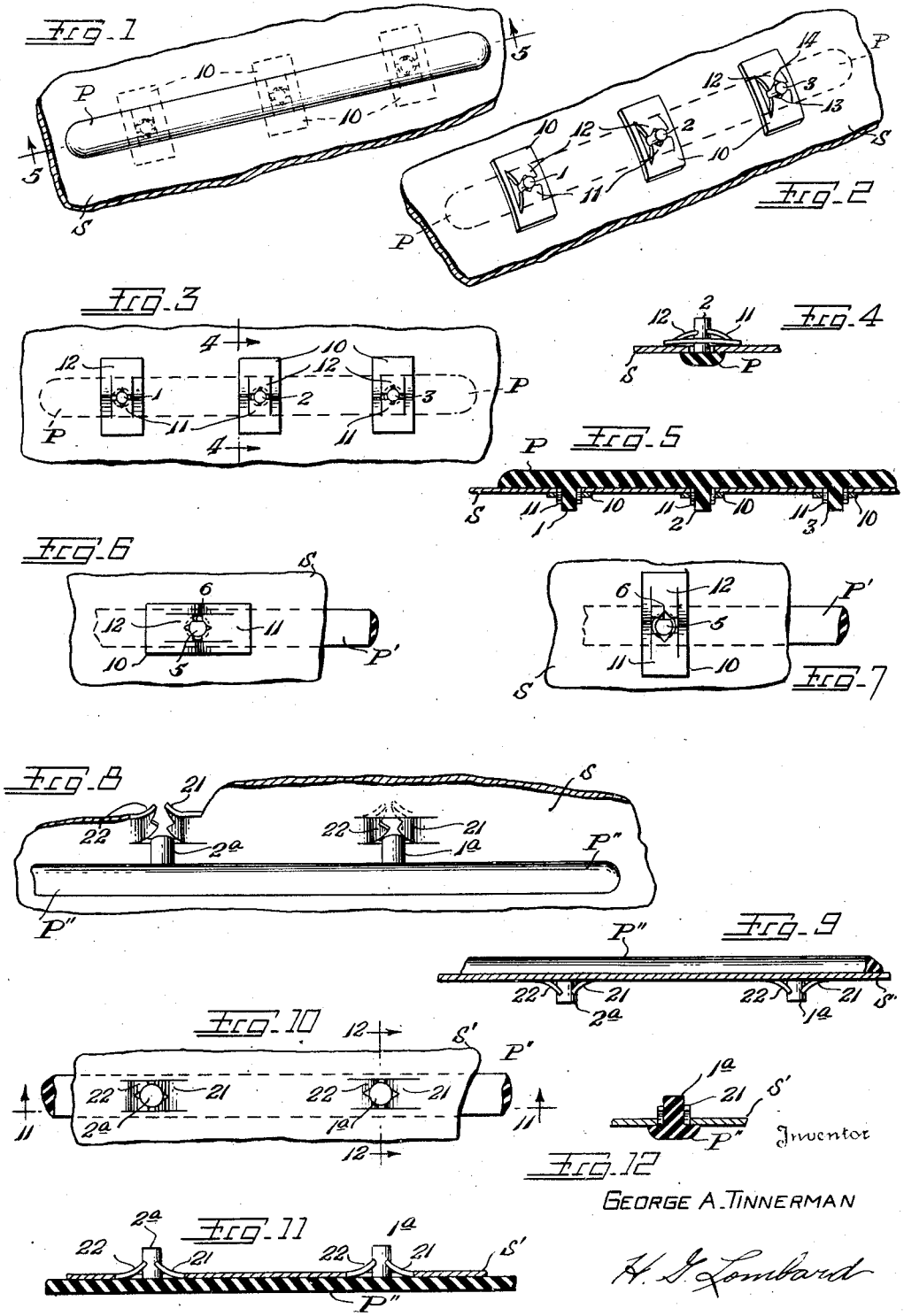

2,191,689

UNITED STATES PATENT OFFICE 2,191,689

FASTENING MEANS

George A. Tinnerman, Rocky River, Ohio, assignor to Albert H. Tinnerman, Cleveland, Ohio Application September 22, 1937, Serial No. 165,181

1 Claim. (Cl. 85—36)

This invention relates to trim molding constructions and like installations embodying similar ornamenting objects, particularly those made of hardened plastic or like material molded into any suitable design or configuration and mounted on a supporting surface in a new and novel manner so as to embellish the latter and create a novel and artistic appearance.

More particularly, this invention is directed to a novel method and means for ornamenting a panel or similar surface in an installation comprising hardened plastic parts such as trim strips, knobs, moldings, and like finishing objects, so formed in the molding operation as to provide means designed for effective connection to such surface and adapted to be easily and quickly assembled and reliably held in applied position thereon.

The manufacture and use of molded, plastic, ornamenting and trim objects has, of recent years, assumed tremendous importance in industry and is now produced by various methods under the trade names of Bakelite, Tenite, Catalin, Durite, Beetle, etc. Such molded objects have as the main ingredient some form of thermoplastic material such as resin, shellac, Celluloid, synthetic rubber, and the like. Sufficient of such plastic material is mixed with a filler, coloring matter and lubricant and placed into a mold and subjected to heat and/or pressure, or both simultaneously. The plastic mix is thus transformed into a homogeneous solid mass which becomes hardened when subjected to a curing cycle.

The plastic objects which may be thus produced find a wide and varied use in that almost any object may be duplicated even to the extent of the most difficult sizes and shapes. In addition, plastic parts are possessed of characteristics which make them more useful and advantageous in certain applications than the more common type of materials. Such characteristics, for example, are exceptional beauty, unusual dielectric properties, relatively high impact strength, high heat resistance, chip-, rust-, corrosion-, and shatter-proofness and extreme hardness, toughness and durability.

It is the property of extreme hardness which has heretofore made it difficult and in some applications prohibitive to provide an effective, satisfactory, inexpensive means for securing, connecting or mounting a plastic trim or ornamenting object on a supporting surface or panel member. In the connection or mounting of hardened plastic parts to supporting members of different material such as, for example, a metal panel, it has heretofore been necessary to provide the plastic object with some form of screw-threaded fastening means such as threaded metallic inserts molded into the plastic parts, screw threaded fastening devices driven into tapped holes in the plastic part, or the application of an adhesive or cement to bind the plastic object to the supporting member. Due to the extreme hardness of plastic materials, the use of nails is impossible. Attempts also have been made to drive an apertured plastic part onto a rigid, ratchet-type shank but due to its extreme hardness, a plastic object is also relatively brittle, and will therefore crack and break under any concentrated blow or impact.

It has been found that threaded metallic inserts molded with the plastic parts are objectionable and expensive in that they make for increased shipping weight, require longer curing cycles for hardening, and involve added costs in that they require the use of special forms and molding equipment to insure that the plastic composition, when being flowed into the mold, will not disturb the position of the metallic insert in the completed trim object.

In the use of screw-threaded fastening devices in plastic parts, a hole must be bored, the hole tapped, and the fastening device laboriously threaded into the tapped hole. This procedure is expensive in that it requires several time-consuming operations, results in the weak threads that easily cross and tend to break quickly, and which, most often, are not in proper alignment due to the infinite number of porous, rough spots, thin-walled gas pockets and other mold imperfections which prevent the screw threads of a fastening from being accurately and precisely threaded into a tapped hole in the molded object or part.

The use of an adhesive such as cement for uniting a plastic part with a supporting member has been found unsatisfactory in that it tends to dry out quickly and works loose due to changes in atmospheric conditions and frequent handling. Then again, in employing a cement, the assembly must usually be subjected to an expensive and time-consuming fusing operation in order to obtain a satisfactory connection of the plastic part with the supporting member.

It is therefore an object of this invention to provide an installation for ornamenting a supporting surface, comprising hardened plastic trim objects provided in the molding operation with integral stud means designed for ready connection to the supporting surface for quickly and reliably mounting the plastic object thereon so as to embellish such surface and create a novel and artistic appearance.

Another object contemplates the provision of an installation for ornamenting a supporting surface by hardened plastic trim objects mounted on such surface by fastening means adapted for engagement with integral stud elements or the like provided on the plastic object during the molding operation thereof.

A further object aims to provide an installation for ornamenting a surface embodying plastic trim objects, such as moldings, trim strips, and the like, provided with integral connecting studs or projections adapted to cooperate in assembled relation with inexpensive, light-weight, securing devices comprising spring tongues, friction rings, locking collars, clamps, clasps and the like, with which the plastic trim objects are easily and quickly assembled and reliably held in operative position in providing an installation which is strong and durable in use.

A further object is to provide an installation for ornamenting a surface by plastic trim objects held in position by securing means simplifying the assembly thereof on the surface and dispensing with the necessity of adhesives, cements and special operations required in the application and use of the common screw-threaded type fastening means such as threaded, metallic inserts and drive screws.

A still further object is to provide a means for ornamenting a surface by plastic trim objects having integral, rigid, connecting studs or projections to which securing means are readily applied to permanent engagement in the assembly thereof on the supporting surface and cannot be disconnected without destruction of the securing means and/or mutilating the connecting stud.

A more specific object is to provide an installation comprising plastic trim objects provided with integral connecting studs of suitable design to which fastening means such as clip devices, friction collars, and the like, may be readily applied for effectively mounting the same but which may be removed in a simple, expedient manner without injuring the fastening means or the connecting studs such that the same may be again employed in the same or a similar installation.

A further object is to provide a means for ornamenting a supporting surface comprising plastic trim objects mounted on the supporting surface by one or more integral connecting studs on the plastic object cooperating with integral fastening elements deformed from the supporting member.

Further objects and advantages of the invention will be apparent to those skilled in the art as a description thereof proceeds with reference to the accompanying drawing in which like reference characters designate like parts throughout the same, and in which:

Fig. 1 is a fragmentary, perspective view showing an installation comprising a plastic trim object such as a molding or trim strip mounted on a supporting surface by individual securing devices engaging integral connecting studs provided on the plastic object;

Fig. 2 is a perspective view looking from the underside of Fig. 1;

Fig. 3 is a bottom plan view of Fig. 1;

Fig. 4 is a section view of Fig. 3 taken on line 4—4 and showing in side elevation a securing device and the engagement thereof with a connecting stud provided on the trim object;

Fig. 5 is a section taken on line 5—5, Fig. 1;

Fig. 6 shows a securing device applied to fastening engagement with a connecting stud of such form as to permit disconnection therefrom by relative turning movement;

Fig. 7 shows the securing device of Fig. 6 ninety degrees removed and out of fastening engagement with the connecting stud on the plastic part such that it may be disconnected therefrom;

Fig. 8 shows the method of ornamenting as embodied in an alternate construction, shown in perspective, wherein the securing means engaging the connecting studs of the trim object are provided by integral elements deformed from the supporting member, parts of the supporting member being broken away to illustrate in detail the elements of the securing means;

Fig. 9 is a side elevational view of an installation showing the trim object as mounted in applied position on the supporting member, represented in section;

Fig. 10 is a bottom plan of Fig. 9 showing the fastening engagement of the integral securing means provided in the support with the integral connecting studs of the plastic trim object;

Fig. 11 is a section of Fig. 10 taken on line 11—11, showing the integral securing elements in side elevation; and, Fig. 12 is a sectional view along line 12—12 of Fig. 10.

In carrying out the present invention the plastic trim objects are constructed of any desired design, shape, or configuration of suitable cross-section. Preferably, an object has at least one face which is substantially flat or of such contour as to seat flush with the surface of the supporting member. The plastic objects are provided with projections or connecting studs adapted for use with securing devices in the form of clip fastenings, friction collars, rings, clasps, or the like, which may be easily and quickly applied to engage the connecting studs whereby the plastic object is reliably mounted in desired position. The connecting studs are suitably disposed on the plastic object either by providing integral hubs or bosses which are ground, machined or otherwise finished to produce the desired connecting studs, or by so designing the mold form such that integral connecting studs of desired shape and form are provided on the finished plastic object when taken from the mold.

It has been found that the latter method of providing integral connecting studs on the plastic object during the molding operation is most practical, involves little or no added cost or expense, and requires no time-consuming finishing operations for the plastic object.

A completed plastic object provided with suitably disposed connecting studs is mounted upon a supporting surface by providing properly spaced openings therein through which the connecting studs may pass to seat the plastic object flush with a face thereof in assembled relation, whereupon securing means in the form of spring tongues, yieldable jaws, clips, friction collars, rings, clamps, clasps, or the like, may be effectively engaged with the projecting portions of the connecting studs at the opposite face of the support to maintain the plastic object in applied position in assembled relation thereon.

Referring to the drawing, Figs. 1-5 inclusive show an installation for ornamenting a supporting surface S in the use of a plastic object P, such as a molding or trim strip, provided with integral connecting studs 1, 2, 3 passing through perforations in the supporting member S, and held firmly in applied position by individual securing devices such as clips having one or more yieldable tongues or friction grip elements which may flex transversely of the plane of the supporting member to permit the connecting studs to be advanced to such position as to seat the plastic object flush with the adjacent face of the supporting member.

As shown particularly in Fig. 2, the securing devices may be in the form of locking members 10 each comprising a section of sheet metal including yieldable tongues 11, 12 which may flex and be forced apart when a connecting stud is introduced therebetween and thus caused to assume opposing, substantially inclined positions as shown in Fig. 4 to frictionally and grippingly engage the associated connecting stud of the plastic object. Preferably the tongues 11, 12 of the securing devices are notched at their extremities as at 13, 14, Fig. 2, to provide sharp jaws adapted to bite into the connecting studs under tension, to substantially locked engagement in applied position. Thus, any attempt to withdraw a connecting stud from the locking tongues will be tenaciously resisted by the tensioned tongues due to their inclined positions in a direction opposed to reverse movement of the connecting stud from applied position. In effect, any outward pull of the plastic object to remove a connecting stud from the tensioned tongues causes the jaws thereof to bite deeper into the body of the hardened plastic connecting stud. To increase the resiliency of the securing device as a whole, and particularly to insure an inherent resiliency in the yieldable tongues, the base of the securing device may be arched or dished as shown in Fig. 4 such that any play or looseness which may develop in the assembly will be compensated for and taken up by the added resiliency thus obtained by the arched base and the inherently resilient tongues. It will therefore be seen that, after having thus been mounted on a supporting member, a plastic object cannot be removed without mutilating, deforming or otherwise injuring the securing devices and damaging the connecting studs such that they are unfit for use in the same or a similar assembly. If desired, the individual securing devices may be permanently attached to the back of a supporting member by any expedient means such as riveting, spot-welding, etc., such that the assembly of a plastic object with the supporting member is facilitated and greater security of the plastic object against shifting from assembled position is obtained.

Although the securing devices are shown as comprising substantially flat sections of relatively thin metal, preferably spring-steel, and provided with yieldable friction tongues deformed from the plane of such sections, it is fully intended as within the scope of this invention, that the securing devices may be constructed from any other suitable material, such as sheet metal, cold rolled metal, sections of papier-mâché, and the like, and made in such form as to engage the integral connecting studs on a plastic object in the manner of friction collars, locking rings, clips, clamps, clasps, etc. This invention also comprehends the use of connecting studs of any desired cross section and, if expedient or desirable, provided with shoulders, abutments, grooves, etc.

cooperating with elements of the securing means in tending to resist withdrawal and preventing removal of a plastic object from its applied position on a supporting member.

It will quite readily be recognized that the form of securing devices shown embodied in the method of this invention are inexpensive, simple, durable, light in weight, and easily and quickly applied to fastening position by reason of the yieldable friction tongues which, initially, present a substantial socket and subsequently, flex to permit the connecting stud to be advanced to home position whereupon they are effective to grippingly engage and frictionally retain the stud in applied position. The yieldable action of the tongues allows them to serve substantially as spring tongues in which relation they are adapted for use with connecting studs of different diameters and various cross-sections in addition to providing a substantially positive locked mounting of a plastic object in assembled relation on a supporting member.

Figs. 6 and 7 show an installation of the invention as embodied in an alternate construction wherein the plastic object is removable from its mounting on a supporting member. In this form, the connecting studs 5, on a plastic object P', are provided with reduced or cutaway portions 6 which in normal application of the securing devices, does not affect the efficiency or holding ability thereof through the yieldable friction tongues 11, 12, substantially as set forth with reference to Figs. 1–5 inclusive. However, upon turning movement of a securing device relative to the associated connecting stud to the position substantially as shown in Fig. 7, the extremities of the tongues 11, 12 are disposed out of fastening engagement with the connecting stud by reason of the reduced portion 6, whereupon the securing device is removable and the plastic object may be disconnected from its mounting on the supporting member S.

Figs. 8-12 inclusive show a further embodiment of the invention wherein the use of individual securing devices is dispensed with and securing means in the form of integral, friction tongue elements, or the like, are struck from the supporting member such as to frictionally and grippingly engage the connecting studs of a plastic object applied thereto. As shown in Fig. 8, the securing means for engaging the connecting stud may comprise one or more yieldable tongues 21, 22, deformed from the supporting member S' in such manner as to permit introduction of the connecting studs 1a, 2a, therebetween, and to frictionally and grippingly engage the same to mount the plastic object P'' in its applied position flush with the supporting member S' substantially as shown in Fig. 9. Preferably the tongues 21, 22 are notched to provide jaws which bite into the connecting studs in locked relation thereto substantially as in the embodiment of the invention in which individual securing devices are employed. In the same manner, any attempt to withdraw a connecting stud from applied position will be resisted by the tongues 21, 22, Fig. 11, and will result in the same biting deeper into the connecting stud and becoming more firmly embedded therein by reason of their inherent resiliency.

From the foregoing it will be seen that all embodiments of this invention comprehend the use of integral connecting studs suitably provided on the plastic object in accordance with its contour, configuration, cross-section, etc. in addition to its specific use either as a molding, trim strip, knob, or other finishing object which it is desired to be mounted on a supporting member to embellish the same and create an ornamental, artistic appearance.

It will be further evident that the invention also comprehends the use of securing means comprising spring tongues, yieldable jaws, friction rings, locking collars, clamps, clasps, and the like, designed for ready engagement with connecting studs on plastic objects to maintain the same in their assembled relation on a supporting member and to tenaciously resist any loosening or movement of the connecting studs toward withdrawal, or disconnection of the plastic object from applied, assembled position on the supporting member.

In another relation the instant method teaches the use of individual simple, inexpensive securing devices easily and quickly applied to connecting studs provided on a plastic object to reliably mount the same on a supporting member. In a further relation, individual securing devices are employed for engaging a connecting stud so designed as to permit removal of the securing devices if desired.

It will be further appreciated that the invention contemplates the provision of means for mounting a hardened plastic object on a supporting surface comprising integral securing elements, stamped, deformed, extruded or otherwise provided on the supporting member so as to grippingly and frictionally engage connecting studs provided on the plastic object to reliably hold the same in applied position.

And while the invention has been described in detail with specific examples, such examples are illustrative only since it will be apparent to those skilled in the art that other embodiments within the spirit and scope of the invention may be constructed without departing from the teachings or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed is:

In the art of fastening an object of relatively thin cross-section to a supporting part, said object being provided with a substantially smooth connecting stud integrally molded therewith, said connecting stud being receivable in an opening in the supporting part to project onto the reverse side thereof in the assembled relation of said object and part, means for securing the relatively thin object in such assembled relation comprising a locking plate securing device applied to the projecting portion of said substantially smooth connecting stud at the reverse side of said supporting part, said locking plate having a generally arched base for resiliency and including a pair of cooperating tongues or the like struck and formed therefrom to project out of the plane thereof, said tongues being curved intermediate their lengths in the same general direction as said generally arched base and having their extremities spaced apart a distance less than the cross-section of said connecting stud in normal untensioned relation, said tongue extremities being substantially oppositely disposed and thereby adapted for substantially equal biting relation with said connecting stud, said generally arched base of the locking plate in applied fastening position serving to exert an axial force on said connecting stud through said tongues in substantially equal biting relation therewith, whereby any play or looseness in the connection is taken up by said generally arched base of the locking plate in providing a rigid tightened assembly of said object and part.

GEORGE A. TINNERMAN.